US007979980B2

(12) United States Patent
Westley et al.

(10) Patent No.: US 7,979,980 B2
(45) Date of Patent: Jul. 19, 2011

(54) TOOL FOR POWERED PRESSING OF CABLE CONNECTORS

(75) Inventors: Todd A. Westley, Elyria, OH (US); Richard W. Ballas, Vermillion, OH (US); Richard R. Bowles, Solon, OH (US); Brian A. Mitchell, Olmsted Falls, OH (US)

(73) Assignee: Emerson Electric Co., St. Louis, MO (US)

( * ) Notice: Subject to any disclaimer, the term of this patent is extended or adjusted under 35 U.S.C. 154(b) by 627 days.

(21) Appl. No.: 12/132,178

(22) Filed: Jun. 3, 2008

(65) Prior Publication Data

US 2009/0013523 A1 Jan. 15, 2009

Related U.S. Application Data

(60) Provisional application No. 60/959,064, filed on Jul. 11, 2007, provisional application No. 61/012,979, filed on Dec. 12, 2007, provisional application No. 61/012,992, filed on Dec. 12, 2007.

(51) Int. Cl.
*B23P 19/00* (2006.01)
*H01R 43/00* (2006.01)

(52) U.S. Cl. ................ 29/755; 29/748; 29/750; 29/753; 29/758; 29/33 M; 72/453.03; 72/453.14; 72/453.16

(58) Field of Classification Search .................... 29/755, 29/748, 750, 751, 753, 758, 761, 33 M; 72/453.01, 72/453.03, 453.14, 453.16, 456
See application file for complete search history.

(56) References Cited

U.S. PATENT DOCUMENTS

| | | | |
|---|---|---|---|
| 2,371,423 | A | 3/1945 | Buchet |
| 2,554,328 | A | 5/1951 | Grimes |
| 2,805,591 | A | 9/1957 | Widmer |
| 3,299,496 | A | 1/1967 | Christensen |
| 3,325,885 | A | 6/1967 | Ziegler, Jr. et al. |
| 3,334,511 | A | 8/1967 | Hawkins |
| 3,423,987 | A | 1/1969 | Kingler |
| 3,477,120 | A | 11/1969 | Werner et al. |
| 3,495,670 | A | 2/1970 | Ditson |
| 3,653,115 | A | 4/1972 | Perkins |
| 3,660,883 | A | 5/1972 | Hoeckele |
| 4,170,125 | A | 10/1979 | Minka |
| 4,178,669 | A | 12/1979 | Hara et al. |
| 4,189,817 | A | 2/1980 | Moebius |
| 4,257,135 | A | 3/1981 | Moebius |
| 4,484,384 | A | 11/1984 | Knowles |
| 4,730,385 | A | 3/1988 | Ryan et al. |
| 4,785,517 | A | 11/1988 | Takano |
| 5,099,561 | A | 3/1992 | Santiago |
| 5,105,648 | A | 4/1992 | Steiner et al. |
| 5,211,049 | A | 5/1993 | Lucas |
| 5,367,756 | A | 11/1994 | Huetinck |

(Continued)

FOREIGN PATENT DOCUMENTS

| | | | |
|---|---|---|---|
| GB | 882796 | A | 11/1961 |

*Primary Examiner* — Thiem Phan
(74) *Attorney, Agent, or Firm* — Rankin, Hill & Clark LLP

(57) ABSTRACT

A press frame for attaching connectors to workpieces such as cables and pipes is described. The press frame is adapted to be releasably attached to a hand-held, battery powered press tool. The press frame includes selectively interchangeable components that enable a wide range of different styles, sizes, and configurations of electrical connectors to be attached to cables.

10 Claims, 11 Drawing Sheets

U.S. PATENT DOCUMENTS

| | | | |
|---|---|---|---|
| 5,375,309 | A | 12/1994 | Dunn |
| 5,392,508 | A | 2/1995 | Holliday et al. |
| 5,398,394 | A | 3/1995 | Hyatt |
| 5,483,731 | A | 1/1996 | Prendel et al. |
| 5,537,727 | A | 7/1996 | Mayer |
| 5,647,119 | A | 7/1997 | Bourbeau et al. |
| 5,680,687 | A | 10/1997 | Hyatt et al. |
| 5,722,147 | A | 3/1998 | Brazle |
| 5,749,604 | A | 5/1998 | Williams |
| 5,802,690 | A | 9/1998 | Bullock |
| 5,845,393 | A | 12/1998 | DePaiva |
| 5,941,120 | A | 8/1999 | Jee |
| 6,116,069 | A | 9/2000 | Holliday |
| 6,131,261 | A | 10/2000 | Michlin |
| 6,230,542 | B1 | 5/2001 | Frenken |
| 6,272,738 | B1 | 8/2001 | Holliday et al. |
| 6,276,186 | B1 | 8/2001 | Frenken |
| 6,293,004 | B1 | 9/2001 | Holliday |
| 6,324,739 | B1 | 12/2001 | Fujii et al. |
| 6,532,790 | B2 | 3/2003 | Frenken |
| 6,550,119 | B2 | 4/2003 | Ishida et al. |
| 6,591,487 | B2 | 7/2003 | Chang |
| 6,594,888 | B2 | 7/2003 | Chang |
| 6,658,711 | B1 | 12/2003 | Benson |
| 6,671,944 | B2 | 1/2004 | Holliday et al. |
| 6,684,679 | B2 | 2/2004 | Hsieh |
| 6,691,402 | B2 | 2/2004 | Chang |
| 6,708,396 | B2 | 3/2004 | Holliday |
| 6,732,393 | B1 | 5/2004 | Liao |
| 6,769,173 | B2 | 8/2004 | Chadbourne |
| 6,792,789 | B1 | 9/2004 | Faucher |
| 6,807,728 | B2 | 10/2004 | Griffin et al. |
| 6,820,326 | B1 | 11/2004 | Tarpill et al. |
| 6,901,647 | B2 | 6/2005 | Foster et al. |
| 6,948,234 | B1 | 9/2005 | Steiner |
| 7,028,393 | B2 | 4/2006 | Wei |
| 7,096,573 | B2 | 8/2006 | Holliday |
| 7,120,997 | B2 | 10/2006 | Islam et al. |
| 7,124,608 | B2 | 10/2006 | Goop |
| 7,124,619 | B1 | 10/2006 | Lefavour et al. |
| 7,152,309 | B2 | 12/2006 | Liao |
| 7,165,439 | B2 | 1/2007 | Lefavour et al. |
| 7,188,507 | B2 | 3/2007 | Holliday et al. |
| 7,217,155 | B2 | 5/2007 | Montena |
| 7,225,532 | B2 | 6/2007 | Wei |
| 7,275,293 | B2 | 10/2007 | Wathey |
| 7,299,542 | B2 | 11/2007 | Montena |
| 7,299,543 | B2 | 11/2007 | Montena |
| 7,318,272 | B1 | 1/2008 | Steiner |
| 7,322,085 | B1 | 1/2008 | Benson |
| 7,346,980 | B2 | 3/2008 | Liao |
| 7,363,799 | B2 | 4/2008 | Hamm et al. |
| 7,421,768 | B2 | 9/2008 | Chiang |
| 7,426,782 | B2 | 9/2008 | Johnson et al. |
| 7,444,744 | B2 | 11/2008 | Caveney et al. |
| 7,475,475 | B2 | 1/2009 | Sullivan |
| 7,506,531 | B1 | 3/2009 | Lendway, IV et al. |
| 7,562,442 | B2 | 7/2009 | Montena |
| 2003/0051337 | A1 | 3/2003 | Holliday |
| 2003/0150105 | A1 | 8/2003 | Araki |
| 2003/0204943 | A1 | 11/2003 | Geurts |
| 2004/0128814 | A1 | 7/2004 | Esson et al. |
| 2006/0143904 | A1 | 7/2006 | Holliday |
| 2006/0179646 | A1 | 8/2006 | Xie et al. |
| 2006/0179647 | A1 | 8/2006 | Montena et al. |
| 2006/0194474 | A1 | 8/2006 | Montena |
| 2006/0288552 | A1 | 12/2006 | Roll et al. |
| 2007/0251085 | A1 | 11/2007 | Holliday et al. |
| 2008/0010825 | A1 | 1/2008 | Chawgo |
| 2008/0201941 | A1 | 8/2008 | Montena |
| 2008/0263859 | A1 | 10/2008 | Wang et al. |
| 2009/0014212 | A1 | 1/2009 | Malak |
| 2009/0064754 | A1 | 3/2009 | Chawgo |
| 2009/0144974 | A1 | 6/2009 | Sullivan |

TOOL FOR POWERED PRESSING OF CABLE CONNECTORS

CROSS REFERENCES TO RELATED APPLICATIONS

The present application claims priority upon and incorporates by reference U.S. Ser. No. 60/959,064 filed Jul. 11, 2007; U.S. Ser. No. 61/012,979 filed Dec. 12, 2007; and U.S. Ser. No. 61/012,992 filed Dec. 12, 2007.

FIELD OF THE INVENTION

The presently disclosed embodiments are directed to the field of press tools for attaching electrical connectors to cables, and specifically, tools used in conjunction with hand-held powered presses.

BACKGROUND OF THE INVENTION

Electrical cables and specifically cables for transmitting electrical signals are typically joined by use of one or more connectors. The connectors physically join ends or other regions of such cables together and provide electrical communication between respective electrical conductors associated with each cable. Although a wide array of connectors are known, when used for connecting an end of a cable to an end of another cable or fitting, the connector of interest is typically compressed about an end of the cable, and then joined via use of the connectors to the other cable or to the fitting.

When connecting cables, it is important to establish secure and thorough electrical connection between respective conductors of the cables. This is particularly significant for coaxial cables. As will be appreciated by those skilled in the art, a coaxial cable is a cable that includes two concentrically aligned conductors, i.e. an inner conductor and an outer conductor, that are arranged within the cable such that they share a common axis. The inner conductor is typically a single wire and can be either solid or stranded. The inner conductor is sometimes referred to as a core. The outer conductor is in the form of a hollow cylinder and surrounds the inner conductor. The outer conductor typically serves as a shield and can be braided or is sometimes in the form of foil. One or more insulating or dielectric materials are typically disposed between the inner and the outer conductors. Coaxial cables usually carry high frequency signals such as radio signals, television signals, or other data. When attaching connectors to coaxial cables, it is important to establish electrical connection between the respective conductors and corresponding portions of the connector.

In view of the wide array of different types, configurations, sizes and applications for coaxial cable, there exists a corresponding wide range of different types, styles, and configurations of connectors. Most if not all connectors, once properly positioned on the ends of the cables to be connected, are compressed to secure and affix the connector to its corresponding cable. Specifically, many connectors are radially compressed about an end of a cable. Connectors are also known which are axially compressed at an end of the cable to achieve a secure and thorough electrical connection with respective conductors in the cables. It is also known to compress a connector in both a radial and axial fashion when affixing it to a cable end. Certain connectors use components having inclined surfaces such that upon application of an axial force to the connector component, radial forces are also generated. Compressive forces of either or both types, are applied to deform the connector, which retains its deformed shape to maintain the resulting joined configuration of the connector and cable. An example of a compressive connector for joining coaxial cable is detailed in U.S. Pat. No. 7,217,155.

Numerous hand tools have been developed for applying the requisite compressive force to sufficiently deform electrical connectors in cable affixing operations. For example, U.S. Pat. Nos. 5,211,049; 5,392,508; and 6,272,738 describe various hand operated tools for affixing connectors and forming electrical connections between cables, and particularly coaxial cables. Although satisfactory in many regards, these hand operated tools are typically not suitable for applications in which a high number of connections need to be made, or if the compressive force necessary to deform the connector exceeds the amount that can realistically be generated from the tool by an operator. An example of high force applications are those involving large diameter, heavy duty coaxial cables known in the industry as “Hard Line” type coaxial cable. Typically, these cables are used in antenna or relay towers, at signal junction terminals on such towers, and at data or signal distribution boxes in the field. These cables can be very thick, typically at least one half of an inch in diameter. These cables may contain numerous layers of shielding metals and one or more other components or utilize sophisticated constructions. All connections must usually be air and water tight to avoid oxidation and contamination within the interior of the cable. Thus, when affixing a connector to an end of such cables, it is important that the connector be sufficiently compressed and deformed about the cable end so that electrical contact is established with the cable conductors, the connector is securely retained to the cable end, and a seal is established from the external environment.

Powered devices capable of forming numerous cable and connector attachments, often at high speeds or with large compressive forces are also known such as described in U.S. Pat. No. 6,116,069. However, most of these devices such as the automated crimping device described in that patent, are not readily portable and so, would not be useful in making on-site connections at precarious locations such as at high elevations on antenna towers, where heavy duty cable such as Hard Line coaxial cable is typically utilized.

Accordingly, there is a need for a tool and system, by which an operator may readily attach a connector to a cable requiring large connection forces directly at a desired location, and particularly at a remote location.

SUMMARY OF THE INVENTION

The difficulties and drawbacks associated with previous type systems are overcome in the present apparatus for a press tool that when used with a conventional hand held powered press tool, readily affixes connectors to cables, and particularly to coaxial cables.

In one aspect, the present invention provides a press frame adapted for engagement and use with a press tool having a displaceable ram in the tool for applying a press force. The press frame comprises a frame releasably engaged with the press tool. The frame defines a first end adapted for engagement with the press tool, a second end opposite from the first end, and a generally hollow interior defined at least partly between the first and the second ends and accessible along an exterior region of the frame. The press frame also comprises a movable plunger disposed within the hollow interior defined in the frame and adapted to engage the ram in the tool and transmit the press force from the press tool. The press frame also comprises a stationary anvil disposed proximate the second end of the frame, the anvil defining a slotted recess for receiving at least one of a workpiece and a connector to be joined thereto. And, the press frame comprises a movable shoe disposed in the hollow interior defined in the frame and positioned between the plunger and the anvil, the shoe defining a receiving region adapted to support a connector. Upon displacement of the press tool ram, the plunger is displaced toward the shoe and application of the press force is transmitted to the shoe toward the anvil. A connector disposed in the shoe is then engaged with the workpiece supported in the anvil.

In another aspect, the present invention provides a press frame comprising a support assembly including a first frame member and a second frame member secured to one another. The first and the second frame members are spaced apart and generally oriented parallel to one another. The support assembly defines a proximal end and a distal end opposite from the proximal end. The press frame further comprises a plunger movably disposed between the first and the second frame members. The plunger is disposed adjacent to the proximal end of the support assembly. The press frame further comprises an anvil secured to the support assembly at the distal end of the support assembly. The anvil serves to support a cable for subsequent attachment to a connector. And, the press frame comprises at least one shoe movably disposed within the support assembly and disposed between the plunger and the anvil. At least one shoe defines a proximal face directed toward the proximal end of the support assembly and a distal face directed toward the distal end of the support assembly. At least one shoe also defines a cradle along the distal face. The cradle serves to receive a connector. Upon application of a press force to the plunger in a direction toward the anvil, the plunger engages the proximal face of the at least one shoe to move the at least one shoe toward the anvil. A connector disposed in the cradle of a shoe can then be engaged with a cable supported in the anvil.

In yet another aspect, the present invention provides a press frame adapted for engagement and use with a press tool having a displaceable ram in the tool for applying a press force. The press frame comprises a frame releasably engaged with the press tool. The frame defines a first end adapted for engagement with the press tool, a second end opposite from the first end, and a generally hollow interior defined at least partly between the first and the second ends and accessible along an exterior region of the frame. The press frame also comprises a movable plunger disposed within the hollow interior defined in the frame and adapted to engage the ram in the tool and transmit the press force from the press tool. The press frame also comprises a jig disposed proximate the second end of the frame and releasably secured to the frame. The jig defines a first interior configuration adapted to correspond to a first connector and a second interior configuration adapted to correspond to a second connector. And, the press frame further comprises a movable shoe disposed in the hollow interior defined in the frame and positioned between the plunger and the jig. The shoe defines a cradle receiving region adapted to support a connector. Upon displacement of the press tool ram, the plunger is displaced toward the shoe and application of the press force is transmitted to the shoe toward the jig. A connector supported in the shoe can then be engaged with a cable positioned in the jig.

In still another aspect, the present invention provides a press frame comprising a support assembly including a first frame member and a second frame member secured to one another. The first and the second frame members are spaced apart and generally oriented parallel to one another. The support assembly defines a proximal end and a distal end opposite from the proximal end. The press frame also comprises a plunger movably disposed between the first and the second frame members. The plunger is disposed adjacent to the proximal end of the support assembly. The plunger includes a projection extending toward the distal end of the support assembly. The press frame also comprises an anvil secured to the support assembly at the distal end of the support assembly. And, the press frame comprises a primary shoe disposed between the proximal end of the support assembly and the anvil. The primary shoe defines a proximal face directed toward the proximal end of the support assembly, and an oppositely directed distal face directed toward the anvil. The primary shoe also defines an engagement aperture along the proximal face of the primary shoe and a recessed receiving region along the distal face of the primary shoe. The press frame further comprises a secondary shoe disposed between the primary shoe and the anvil. The secondary shoe defines a proximal face directed toward the proximal end of the support assembly, and an oppositely directed distal face directed toward the anvil. The secondary shoe defines a cradle along the distal face of the secondary shoe. The secondary shoe includes a projecting engagement region extending from the proximal face of the secondary shoe. The projecting engagement region of the secondary shoe is aligned with the recessed receiving region of the primary shoe. And, the press frame comprises a lanyard assembly including a first post secured to the secondary shoe, a second post secured to the primary shoe, a plate pivotable between at least two positions to selectively attach the primary and secondary shoes together, a releasable clasp secured to the support assembly, and a cable extending between the first post and the clasp. The press frame further comprises a housing secured to the support assembly and extending between the proximal and of the support assembly and the distal end of the support assembly. The housing at least partially encloses a region of the press frame between the secondary shoe and the anvil. Upon application of a force to the plunger in a direction toward the anvil, the plunger is displaced so that the projection engages the receiving aperture defined in the primary shoe and displaces the primary shoe and the secondary shoe toward the anvil.

As will be realized, the invention is capable of other and different embodiments and its several details are capable of modifications in various respects, all without departing from the invention. Accordingly, the drawings and description are to be regarded as illustrative and not restrictive.

DETAILED DESCRIPTION OF THE EMBODIMENTS

Figure 1:
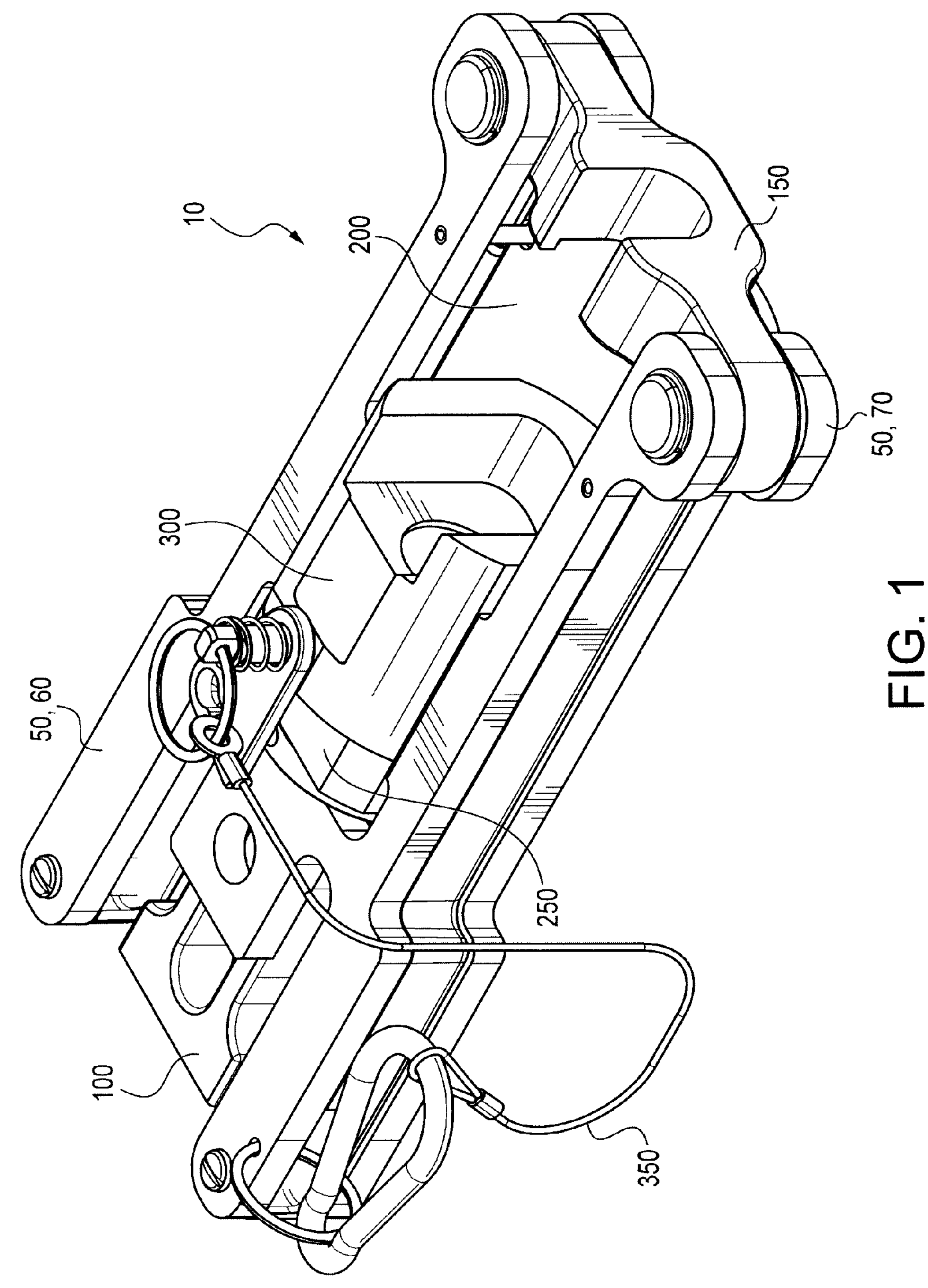
FIG. 1 is a perspective view of a preferred embodiment press frame in accordance with the present invention.

Generally, the present invention relates to a press frame that can be readily attached or otherwise engaged with a hand-held portable, typically battery powered, press tool. An example of a preferred hand-held portable press tool is a tool commercially available from Ridge Tool Company under the designation Compact 100-B Press Tool. Upon attachment to a press tool, the press frame of the present invention can be used to apply relatively large compressive forces to a connector such as a cable connector positioned about the end of a workpiece such as a cable to thereby securely affix the connector to the cable. The present invention also provides various embodiments of the press frame and optional ancillary components that enable a wide range of sizes of cable connectors and cables, to be affixed to one another. Although the present invention press frame is generally described herein as being useful for attaching an electrical connector to a cable, it will be understood that the present invention is not limited to such applications. That is, the present invention press frame can be used to attach nearly any type of connector to a workpiece, such as for example, a cable, a pipe, a hollow conduit or other tube, etc. The connector can include any type of connector such as an electrical connector or fitting such as a plumbing fitting.

As noted, the press frame of the present invention is preferably adapted for use with a portable, hand-held press tool such as the previously noted Compact 100-B Press Tool. However, the present invention press frame is not limited to use with just the 100-B Tool, as other press tools from other suppliers may also be acceptable. Generally, any press tool can be used in conjunction with the present invention press frame so long as the requisite press force and power can be delivered to the press frame and the mounting arrangements meet dimensional compatibility with the Compact 100-B Press Tool. The preferred press tool for use with the present invention is of the type used for providing a press force to a removable jaw set engaged to the tool. Generally such press tools operate by activation of an internal electric motor which powers a hydraulic pump. The pump forces fluid into an onboard cylinder of the tool, thereby forcing a ram outward and applying thousands of pounds of press force to a jaw set that is engaged with the press tool. The present invention press frame is used in place of the jaw set. Examples of representative press tools besides the noted 100-B Tool that may be suitable for use with the present invention press frame include, but are not limited to the press tools described in U.S. Pat. No. 7,124,608. These aspects are described in greater detail in conjunction with details of the preferred embodiments.

In accordance with the present invention, a preferred embodiment press frame is adapted to engage a press tool, and specifically, at the area of the tool at which a press jaw set would be engaged. The press frame generally comprises a frame or support assembly, a movable plunger disposed in the support assembly, a stationary anvil or jig preferably located at an end of the assembly opposite the end at which the assembly attaches to a press tool, and one or more movable shoes also disposed in the support assembly. The press frame is used by attachment to a press tool, such as the previously noted Compact Press Tool 100-B from Ridge Tool Company. A workpiece such as a cable end and a connector to be affixed to the cable end, are placed within a hollow interior generally defined in the press frame. Typically, the cable and a connector portion are supported in the anvil and another connector portion is supported within the shoe. The press tool is activated so that a ram is displaced toward the press frame attached to the tool. The ram engages the plunger and moves the plunger toward the shoe. Displacement of the ram continues as the shoe and plunger travel toward the connector and cable end disposed between the shoe and the anvil. Continuing displacement of the ram results in application of large compressive forces to the deformable connector. Outward displacement of the ram can continue until a predetermined force level is reached, which corresponds to sufficient deformation of the connector and affixment of the connector to the cable end.

More specifically, the frame or support assembly of the press frame is preferably releasably engagable with a press tool. That is, for the previously noted Compact 100-B Press Tool, a removable jaw set is disengaged from the tool, and in its place, the present invention press frame is inserted. The frame or support assembly of the press frame defines a first or proximate end adapted for engagement with the press tool, a second or distal end opposite from the first end, and a generally hollow interior defined at least partly between the first and the second ends and accessible along an exterior region of the frame. The terms "proximal" and "distal" are frequently used herein in describing the press frame and its various components. The term proximal denotes a location that is near or relative to the end of the press frame that is closest to a press tool when the press frame is engaged therewith. And, the term "distal" denotes a location that is away from the end of the press frame at which the press frame is attached to a press tool. Typically, the distal end is the end opposite from the proximal end. The frame or support assembly can be an integral one piece member, or can be formed from a plurality of members. The preferred embodiments described later herein use frame assemblies that are formed from several components. This practice is favored as manufacturing costs are typically less as compared to forming an integral one piece unit. In view of the high forces applied within the interior and to the frame assembly itself, it is preferred that the frame assembly be formed from metal and most preferably from steel. Nearly any grade of steel as used in the tooling arts is acceptable. One or more outer anti-corrosion layers or coatings may be used on all outer surfaces of the press frame and/or its various components.

The present invention press frame also comprises a movable plunger disposed within the hollow interior defined in the frame assembly. The plunger is preferably movable along the length axis of the press frame. The movable plunger is adapted to engage the ram in the tool and transmit the press force from the ram to one or more shoes or other inserts in the press frame described in greater detail herein.

The present invention press frame preferably comprises a stationary anvil disposed near or at an end of the frame opposite the end at which the press frame attaches to a press tool. The anvil defines a slotted recess for receiving a cable and/or a portion of a connector to be joined thereto. The anvil is preferably secured to the frame or support assembly of the press frame so that the anvil is stationary with respect to the movably plunger and movable shoe or other components associated with the press frame. It is also contemplated to form the anvil as part of the frame or support assembly.

The present invention press frame also comprises at least one movable shoe disposed in the hollow interior defined in the frame and positioned between the movable plunger and the stationary anvil. The at least one shoe defines a cradle receiving region adapted to support a connector or a portion of a connector to be attached to a cable end. The shoe is preferably configured to accept a wide array of different configurations and styles of connectors. Furthermore, as described here in greater detail, in certain embodiments it is preferred that the press frame enables the use of different shoes. That is, it is preferred that the frame or support assembly can be opened or otherwise made accessible so that a shoe disposed within the hollow interior can be removed and replaced with a shoe adapted to receive a connector of larger or smaller size.

A wide array of different sized shoes can be used in the present invention press frames. For example, shoes adapted to receive connectors of different diameters can be selectively used and interchanged with one another in the present invention press frames. Also, shoes adapted to receive connectors of different lengths can be selectively used and interchanged with one another in the present invention press frames. Further, shoes adapted to receive connectors of different configurations or geometries can be selectively used and interchanged with one another in the present invention press frames. And, it is contemplated that shoes with any of these features can be interchanged with shoes having any other features.

As the present invention press frame can be used with a plurality of different shoes, it is preferred that the collection or assortment of shoes be retained with the press tool. As previously noted, it is contemplated that for certain applications, the press frame may be used at remote or otherwise precarious locations where it is not feasible or desirable for an operator to make repeated trips to a tool center or vehicle where different shoes or sets of shoes are located in order to obtain a different shoe for use in the press frame. For example, installation or maintenance work on high elevation antenna towers would essentially preclude a worker from making repeated trips between an elevated work location and the ground at which the remaining shoes are located. For at least these reasons, it is preferred that a collection or set of shoes be conveniently tethered or otherwise attached to the press frame. A preferred tethering configuration is to utilize a lanyard or other assembly or tethering strategy between each shoe and the frame or support assembly of the press frame. It is also contemplated to employ a single lanyard for all shoes that are attached to the press frame. Although tethering may promote convenience for the operator, tethering is preferably utilized to improve safety. Employing tethering provisions greatly promotes safety and significantly reduces the potential for shoes or other components falling from the tool when used at elevated work sites. These aspects are described in greater detail in conjunction with the preferred embodiments of the present invention.

In certain embodiments of the present invention, it may be preferred to utilize a single connector support component providing multiple receiving configurations that is movably retained or otherwise fastened to the press frame, and which can be selectively positioned or oriented to provide a desired configuration. The particular configuration is selected based upon the connector. This component may be used in place of the previously described anvil and may use particular configuration(s) adapted to receive one or more connectors. That is, a single member or jig could be provided that is pivotally engaged to the press frame and preferably at a distal end of the frame, but which could be pivoted to one of several positions depending upon the size, shape, and/or configuration of the connector. An embodiment of this aspect is described in greater detail herein.

In yet another aspect, it may in certain embodiments be preferred to utilize a particular set of shoes in conjunction with the present invention press frame. That is, a set of shoes could be provided in which each shoe is sized to be used with a different size connector. Preferably, each of the shoes in the collection is engagable with one another. The shoes could also, in other embodiments, utilize a nested configuration. By "nested" it is meant that in such a collection of shoes, it is preferred that the various shoes have different diameters such that they can fit within one another. In this embodiment, each shoe nests inside a next larger size shoe. When affixing a connector of the smallest size of the shoe set, all shoes are positioned within the press frame. And, when affixing a connector of the largest size, all shoes are removed from the frame, yet preferably tethered thereto. Each shoe can be retained in its nested position with another shoe by use of a ball detent, a magnet, or some other type of low force, positive locating means. The shoes could be slidably positioned from any region of the press frame or retained to the frame by use of a lanyard or other tethering strategy. Yet another strategy related to the nested shoe aspect, is to configure all the shoes so that they fit into the contour of the largest shoe. The largest shoe is preferably integrally formed with the press frame or support assembly, and so is not removable therefrom. The collection of nested shoes can be retained within the hollow interior of the press frame. Depending upon the size of connector to be affixed to a cable end, a shoe of appropriate size is selected and placed in nearest position toward the distal end of the press frame. The remaining shoes can remain in the hollow interior of the press frame, thereby precluding, or at least significantly reducing the likelihood of losing the shoes or having one or more shoes become separated from the device. Thus, a single press frame can be used to affix many different sizes and types of connectors to cable ends merely by adding or removing shoes from the press frame device. This aspect is described in greater detail in conjunction with the preferred embodiments.

As noted, upon engagement of the press frame to an appropriate press tool, the plunger of the press frame is aligned with a ram in the tool. As the ram is extended outward from the press tool, such as by continued operation of a hydraulic pump in the tool to thereby extend the ram from a hydraulic cylinder, the ram contacts the movable plunger and then the plunger is displaced with the ram. An opposite face of the plunger contacts one or more shoes disposed in the hollow interior defined in the frame or support assembly of the press frame. The one or more shoes are, as noted, also movable within the hollow interior of the frame or support assembly of the press frame. The one or more shoes, the plunger, and the ram then continue to be displaced toward a distal end of the press frame. A cable end having been inserted in the press frame and a connector having been placed within one of the shoes are between the moving collection of shoe(s), plunger, and ram, and the stationary anvil or jig of the press frame. Extension of the ram continues until a predetermined force or other condition is reached, at which the connector is affixed to the end of the cable.

Preferably, the present invention press frame may also comprise a housing or guard that serves to at least partially enclose the frame or support assembly. The housing may also, or instead, serve to provide a channel or guideway within which the one or more shoes may be linearly displaced. The housing may also serve to protect the interior region of the press frame from dirt or other contaminants or abrasive materials. Furthermore, the housing can provide a cavity to catch a moveable shoe in the event that it is dropped during the installation process. The housing can be secured to the frame or support assembly of the press frame and provide access to the hollow interior region of the press frame. The preferred embodiment press frames described herein include such housing. The housing can be formed from a variety of materials such as plastic and metal, however, plastic is preferred.

Another preferred aspect of the present invention press frame is the use of one or more biasing elements that urge a shoe toward a distal end of the press frame so as to better retain a connector and cable end positioned within the press frame. Nearly any type of biasing element can be used, however it is preferred that for most applications, a coil spring be used. The spring can be positioned such that one of the shoes, and preferably the shoe proximate the distal end of the press frame, is urged toward that distal end. Thus, when a connector and cable assembly is placed within the press and specifically, when a portion of the connector is positioned upon or within the recessed region of a shoe, the spring or other biasing member urges the shoe and connector portion toward the cable end, thereby promoting maintenance of the relative positions of the connector and cable end in the press frame prior to affixment.

FIG. 1 is a perspective view of a preferred embodiment press frame 10 in accordance with the present invention. The press frame 10 comprises a frame or support assembly, generally denoted as 50. The frame 50 includes a first frame member 60 and a second frame member 70. The first and second frame members are secured to one another and preferably spaced apart and parallel to one another. The press frame 10 further comprises a movable plunger 100 disposed generally within the frame 50. The press frame 10 also comprises a stationary anvil 150 disposed at an opposite end of the frame 50 from the plunger 100. The press frame 10 additionally comprises a housing 200 preferably extending at least along an underside of the frame and generally enclosing an interior region of the frame 50. The press frame 10 further comprises one or more movable shoes disposed within the frame 50. In the preferred embodiment press frame 10 depicted in FIG. 1, two shoes are used, a primary shoe 250 and a secondary shoe 300. The press frame 10 also preferably comprises a lanyard assembly 350. All of these components are described in greater detail with reference to the accompanying figures.

Figure 2:
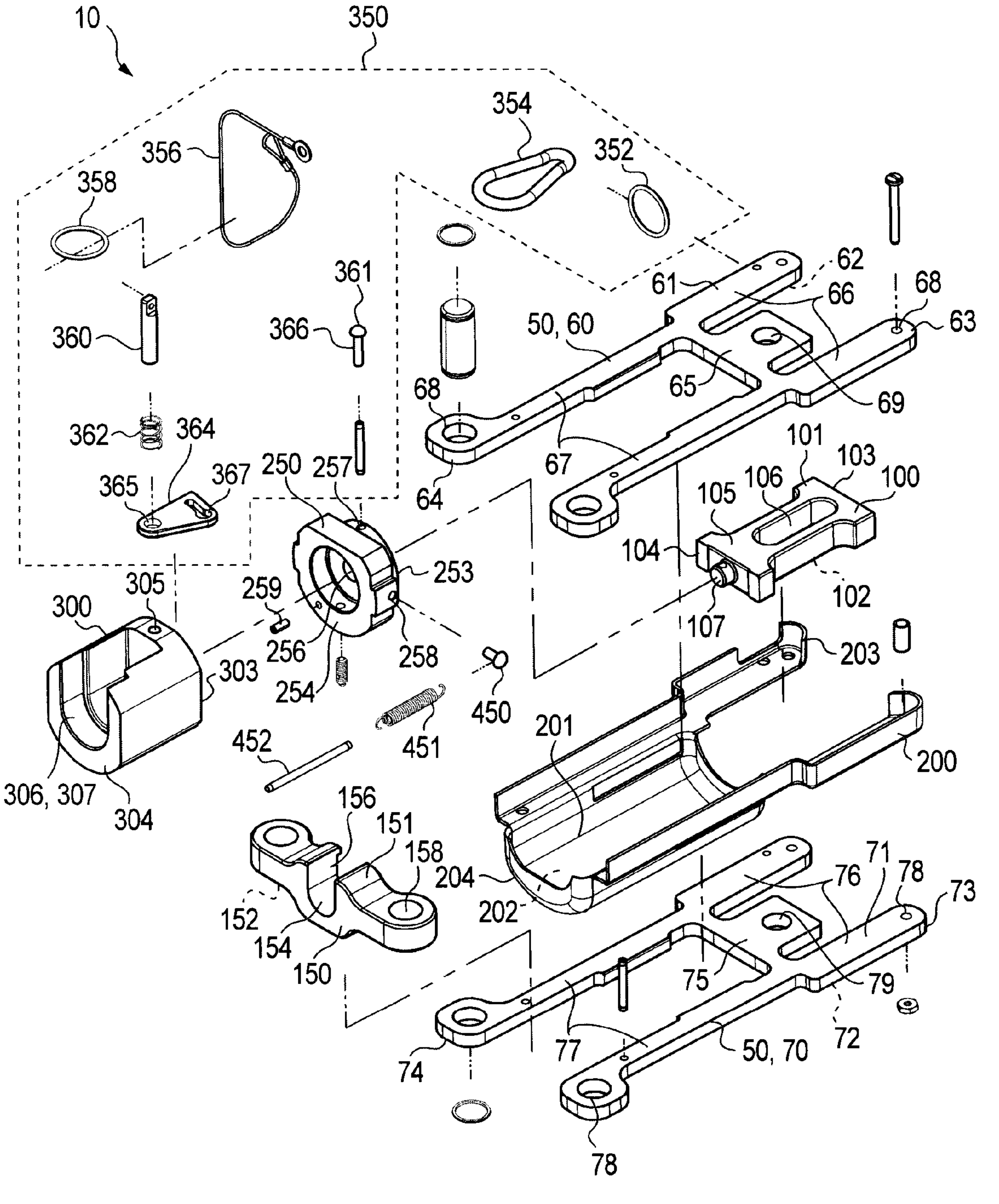
FIG. 2 is an exploded view of the preferred embodiment press frame depicted in FIG. 1.

FIG. 2 is an exploded view of the preferred embodiment press frame 10 depicted in FIG. 1. FIG. 2 illustrates the frame 50 and its frame members 60 and 70. The first frame member 60 defines a first face 61 and an oppositely directed second face 62. The frame member 60 also defines a proximal end 63 and a distal end 64 opposite from the proximal end 63. A pair of proximal legs 66 extends from a body 65. And a pair of distal legs 67 extends from the body 65. The second frame member 70 defines a first face 71 and an oppositely directed second face 72. The frame member 70 also defines a proximal end 73 and a distal end 74 opposite from the proximal end 73. A pair of proximal legs 76 extends from a body 75. And a pair of distal legs 77 extends from the body 75.

FIG. 2 further illustrates the movable plunger 100 which defines a first face 101, a second face 102 that is oppositely directed from the first face 101, and two ends, a proximal end 103 and a distal end 104. The plunger 100 includes a body 105 that defines an opening 106 which, as explained in greater detail, receives an engagement member such as a jaw mounting pin from a press tool when the press frame is engaged thereto. A projection 107 extends from the distal end 104 of the plunger and serves to engage a receiving aperture defined in a shoe, when engaged thereto. These aspects are described in greater detail herein.

FIG. 2 also illustrates the stationary anvil 150. The anvil 150 is preferably disposed between the first and the second frame members 60 and 70, respectively. Most preferably, the anvil 150 is disposed at the distal end of the frame 50 and specifically, at the distal ends 64 and 74 of the frame members 60 and 70, respectively. The anvil 150 defines a first face 151 and a second face 152. The anvil 150 preferably defines a slotted recess 154 along its first face 151 and centered between the ends of the anvil. The recess 154 is defined by a recess surface 156. One or more apertures 158 are preferably provided for assembling the anvil 150 with the frame members 60 and 70.

FIG. 2 further illustrates a housing 200 that generally encloses the underside of the press frame 10. The housing defines a first face 201 and an oppositely directed second face 202. The housing also includes a proximal end 203 and an opposite distal end 204. Various labeling and/or indicia may be provided along the outwardly directed second face 202.

FIG. 2 additionally depicts a primary movable shoe 250. The primary shoe 250 defines a proximal end or face 253 and a distal end or face 254. An engagement aperture 256 is defined along the proximal end 253 and as described in greater detail herein, serves to receive the projection 107 of the plunger 100. The primary shoe preferably also defines an upper aperture 257 and a lateral aperture 258, both of which are described later herein.

A secondary shoe 300 is also preferably included in the press frame 10, as shown in FIG. 2. The secondary shoe 300 defines a proximal end or face 303, an oppositely directed distal end or face 304, an upper aperture 305, and provides a cradle 306 generally defined by a receiving surface 307.

FIG. 2 also illustrates the lanyard assembly 350, generally comprising a first ring 352, a releasable clasp 354, a cable 356, a second ring 358, a first post 360, an optional spring 362, a plate 364 defining an aperture 365 and a slot 367, and a second post 366. The first ring 352 is attached to one of the frame members, and preferably the first frame member 60 at one of its proximal legs 66. The clasp 354 is attached to the ring 352. And the cable 356 is attached to the clasp 354. The second ring 358 is in turn, attached to the cable 356, and also to the first post 360. The post 360 secures the plate 364 to the shoes, and specifically, the secondary shoe 300. It will be appreciated that this is merely one representative configuration of a preferred lanyard assembly. The present invention includes a wide range of variations of this assembly.

Figure 3:
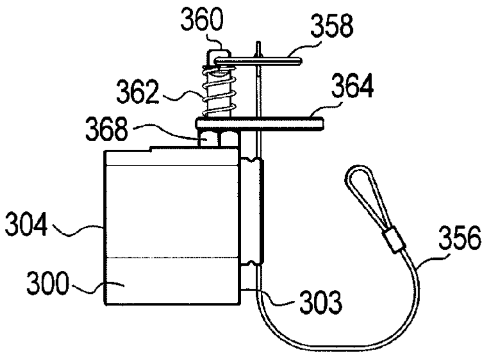
FIG. 3 is a side view of a preferred embodiment shoe for use in the preferred embodiment press frame in accordance with the present invention.

FIG. 3 is a side elevational view of the secondary shoe 300 and a portion of the lanyard assembly used in the press frame 10. The shoe 300, as noted, defines oppositely directed proximal and distal faces 303 and 304, respectively. The post 360 is secured to the shoe 300 and serves to attach the plate 364 and the ring 358 thereto. As noted, the cable 356 is attached to the ring 358. An optional spring 362 may be positioned between the ring 358 and the plate 364 to promote separation between the components and elevation of the ring. And, an optional jam nut 368 or other spacer member may be disposed between the plate 364 and the shoe 300.

Figure 4:
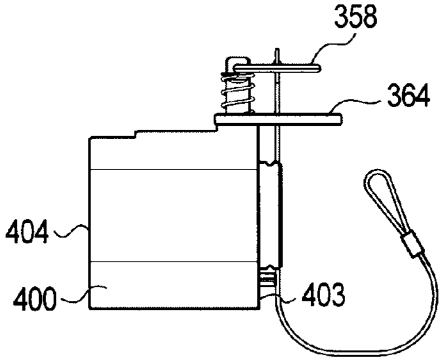
FIG. 4 is a side view of another preferred embodiment shoe for use in the preferred embodiment press frame in accordance with the present invention.

FIG. 4 is side elevational view of another preferred embodiment secondary shoe 400 and a portion of the lanyard assembly used in the press frame 10. The shoe 400 defines oppositely directed proximal and distal faces 403 and 404, respectively. A corresponding post, ring, and plate can be used for the lanyard assembly. This embodiment differs from that depicted in FIG. 3 as the use of a jam nut or spacer member disposed between the plate 364 and the top face of the shoe is avoided.

Figure 5:
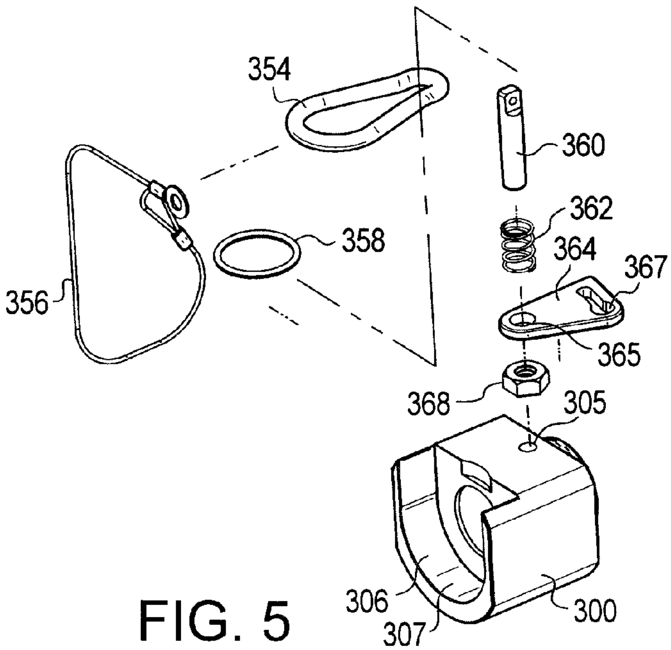
FIG. 5 is an exploded partial view of a lanyard assembly and its attachment to a preferred embodiment shoe in accordance with the present invention.

FIG. 5 is an exploded view of a portion of the lanyard assembly and its attachment to the secondary shoe 300 in accordance with the present invention. The post 360 preferably extends through an optional coil spring 362, the aperture 365 defined in the plate 364, and a jam nut 368, and is ultimately engaged in the upper aperture 305 defined in the secondary shoe 300. The ring 358 attaches to the post 360, and provides a point of attachment for a tether such as the cable 356. As noted, the cable 356 preferably attaches to the clasp 354.

Figure 6:
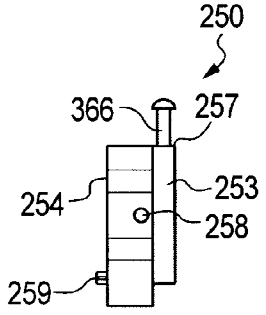
FIG. 6 is a side view of yet another preferred embodiment shoe for use in the preferred embodiment press frame in accordance with the present invention.

FIG. 6 is a side view of the preferred embodiment primary shoe 250 for use in the preferred embodiment press frame 10 in accordance with the present invention. The shoe 250 defines the proximal and distal ends 253 and 254, respectively. The post 366 of the lanyard assembly 350 is preferably secured to the primary shoe 250.

Figure 7:
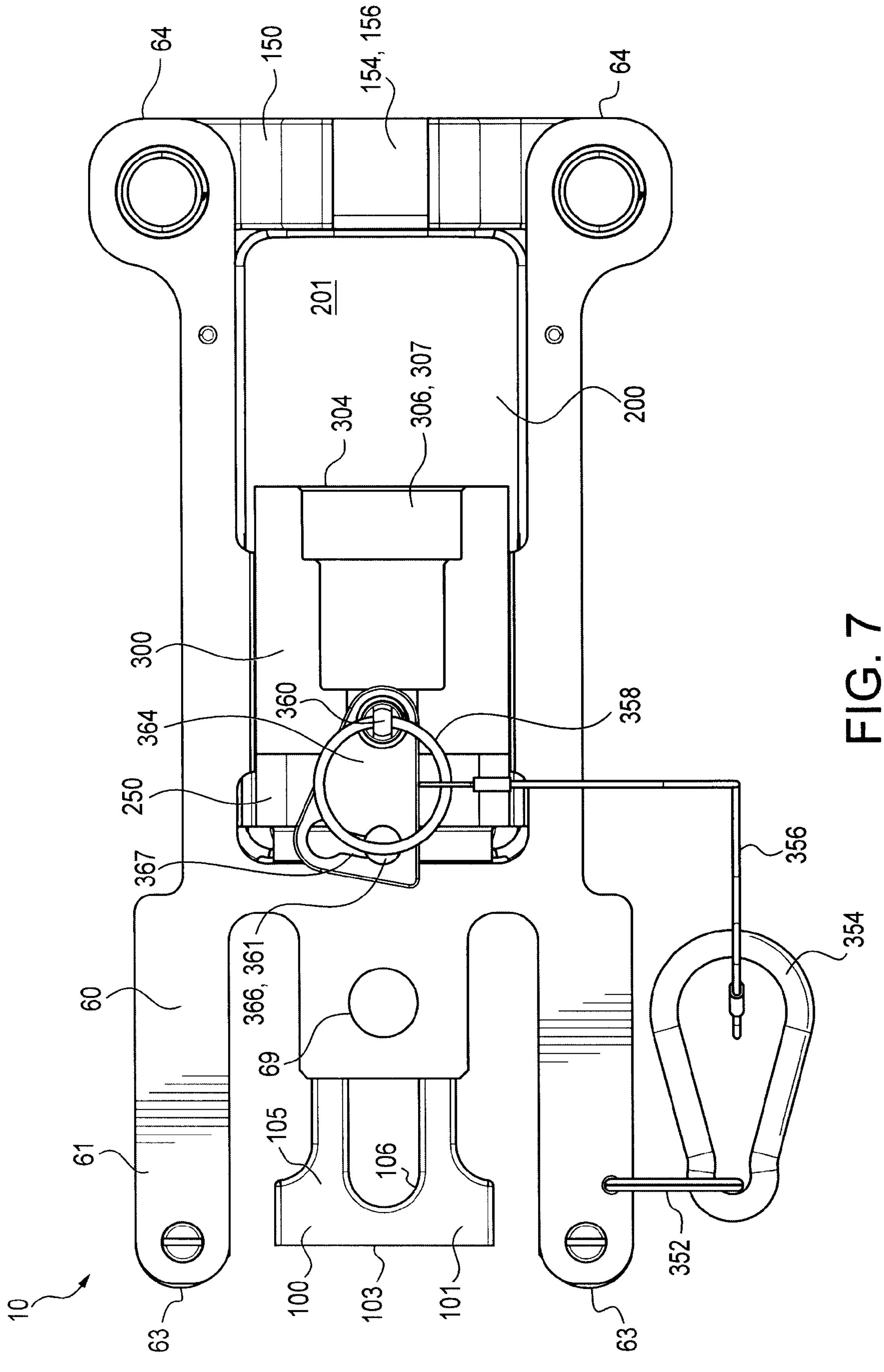
FIG. 7 is a top planar view of the preferred embodiment press frame depicted in FIG. 1.

FIG. 7 is a top planar view of the preferred embodiment press frame 10 depicted in FIG. 1. FIG. 7 illustrates an aperture 69 defined in the first frame member 60 for receiving an engagement member such as a jaw mounting pin typically provided on a press tool, such as the previously noted Compact 100-B Press Tool. A corresponding aperture 79 (not shown in FIG. 7, but see FIG. 2) is defined in the second frame member 70, and is aligned with the aperture 69. The movable plunger 100 disposed between the frame members 60 and 70, defines the slotted opening 106, which is also aligned with the apertures 69 and 79 to permit linear movement of the plunger 100 when the engagement member of a press tool is extended through the collection of openings 69, 106, and 79 when the press frame 10 is engaged to a press tool. When the press frame 10 is engaged to the press tool, one or more rollers or other members from the ram in the press tool typically contact the proximal end 103 of the plunger. Upon extension of the ram in the press tool, the rollers contact the end 103 and transmit force to the plunger. Upon application of such force, the plunger 100 is displaced toward the anvil 150 or distal end 64 of the press frame 10.

FIG. 7 also illustrates operation of the lanyard assembly, and specifically, the plate 364. The plate 364 is secured to the secondary shoe 300 by the post 360. The secondary shoe 300 is retained to the primary shoe 250 by engagement between the plate 364 and the slot 367 defined in the plate 364. The plate 364 and the secondary shoe 300 secured thereto, are releasably attached to the primary shoe 250 by selective engagement between the plate 364 and the post 366. The post 366 includes an enlarged head 361 (see FIG. 2). The plate defines the slot 367 which includes a narrowed region and an enlarged region. In the event that an operator wishes to remove the secondary shoe 300 from the press frame 10, the plate 364 can be pivoted about the post 360 until the post 366 is positioned at the enlarged region of the slot 367. At this enlarged region, the plate 364, and thus the secondary shoe 300, can be disengaged from the pin 366 that extends from the primary shoe 250.

FIG. 7 also depicts a generally open or hollow region defined in the press frame 10, generally between the distal end 304 of the secondary shoe 300 and the anvil 150. This region is partially enclosed by the face 201 of the housing 200 generally extending along the length of one side of the press frame 10. The press frame 10 is used by positioning a cable end having an electrical connector to be affixed thereto, in this region between the shoe 300 and the anvil 150. The cable is preferably oriented such that it extends from the press frame 10 by passing through the slotted recess 154 defined in the anvil 150. Preferably, the cable is supported or otherwise contacts the receiving surface 156 of the recess 154. Depending upon the size and/or length of the connector, the connector or a portion of the connector may also be supported in the recess 154. The connector is generally positioned between the shoe 300 and the anvil 150, and preferably such that an end of the connector is located in the cradle 306 of the secondary shoe 300. Preferably, the connector is in contact with, and supported by the receiving surface 307 defining the cradle 306. And, the connector and cable are preferably aligned along a center axis of the press frame 10 and are generally parallel with the length dimension of the press frame. The secondary shoe 300, by use of a biasing member (not shown in FIG. 7), is urged toward the anvil 150 to promote retention of the connector and cable assembly positioned in the press frame 10.

Figure 8:
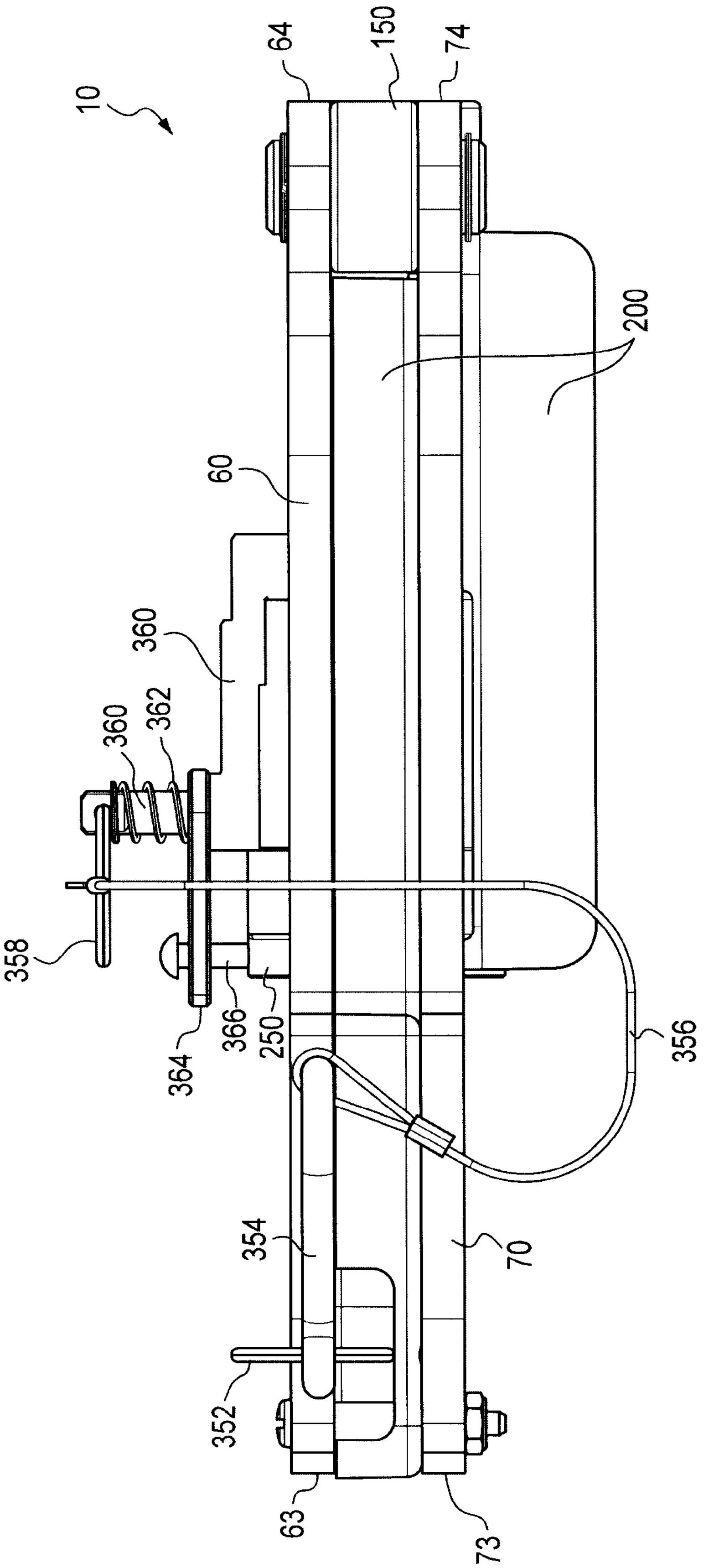
FIG. 8 is a side elevational view of the preferred embodiment press frame depicted in FIG. 1.

FIG. 8 is a side elevational view of the preferred embodiment press frame 10 depicted in FIG. 1. FIG. 8 reveals a preferred configuration for the housing 200. In particular, the housing 200 extends away from the second frame member 70 so as to increase the volume within the region within the press frame 10 for receiving and accommodating a cable and connector assembly when placed therein.

Figure 9:
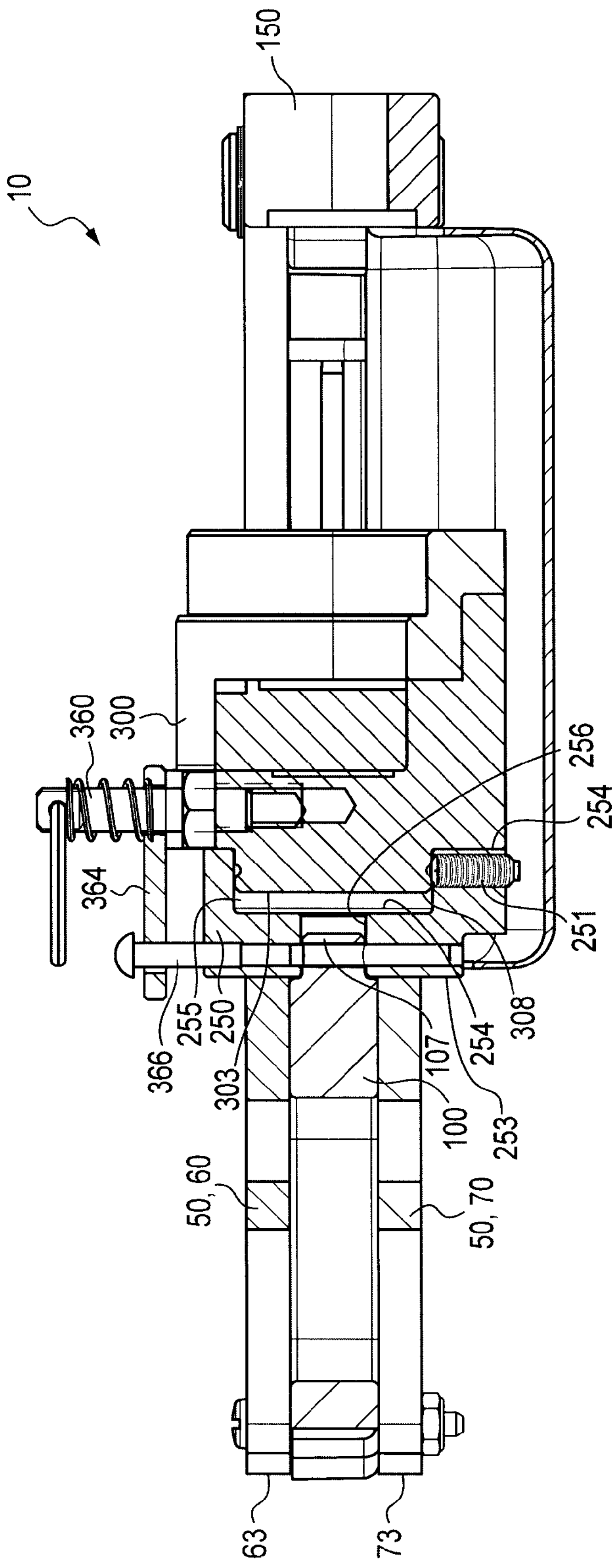
FIG. 9 is a partial cross sectional view of the preferred embodiment press frame depicted in FIG. 1.

FIG. 9 is a partial cross sectional view of the preferred embodiment press frame 10 depicted in FIG. 1. FIG. 9 illustrates a preferred embodiment configuration for engagement between the primary shoe 250 and the secondary shoe 300. The proximal end of the press frame 10 is denoted at ends 63 and 73. And, the distal end of the frame 10 is at the anvil 150. As shown, it is preferred that the shoes 250 and 300 are engaged with one another. Preferably, the distal end 254 of the primary shoe 250 is engaged with and in contact with, the proximal end 303 of the secondary shoe 300. The primary shoe 250 defines a recessed receiving region 255 that is sized and configured to engage and contact a corresponding projecting engagement region 308 of the secondary shoe 300. FIG. 9 also illustrates engagement between the plunger 100 and the primary shoe 250. The projection 107 extending from the distal end of the plunger 100 extends into the engagement aperture 256 defined and accessible along the proximal end 253 of the primary shoe 250.

Referring further to FIG. 9, it is preferred that a biasing member 251 be provided in association with the primary shoe 250, so as to provide a detent or other low force member that releasably engages with the secondary shoe 300. Upon proper positioning of the secondary shoe 300 relative to the primary shoe 250, the member 251, if spring biased to urge outward from the primary shoe 250, engages a correspondingly located recess in the secondary shoe 300 to engage the two shoes together and provide confirmation to an operator that the secondary shoe 300 is properly aligned and oriented with regard to the primary shoe 250. It is also contemplated that a magnetic detent may be provided in conjunction with or instead of the biasing member 251. Such a magnetic detent would releasably engage with the secondary shoe 300 upon appropriate positioning of the shoe 300 relative to the primary shoe 250.

As noted, in certain embodiments it may be preferred to provide one or more biasing elements that urge a shoe toward a distal end of the press frame to promote maintaining relative positions of a connector and cable end prior to affixment. An example of such an optional biasing assembly is depicted in FIG. 2. A post 450 can be secured to the primary shoe 250, such as at the lateral aperture 258. A spring 451 or other biasing member can be attached to the post and its other end secured to a stationary member such as the frame 50. An optional member 452 may be used to promote alignment or positioning of the spring 451.

Figure 10:
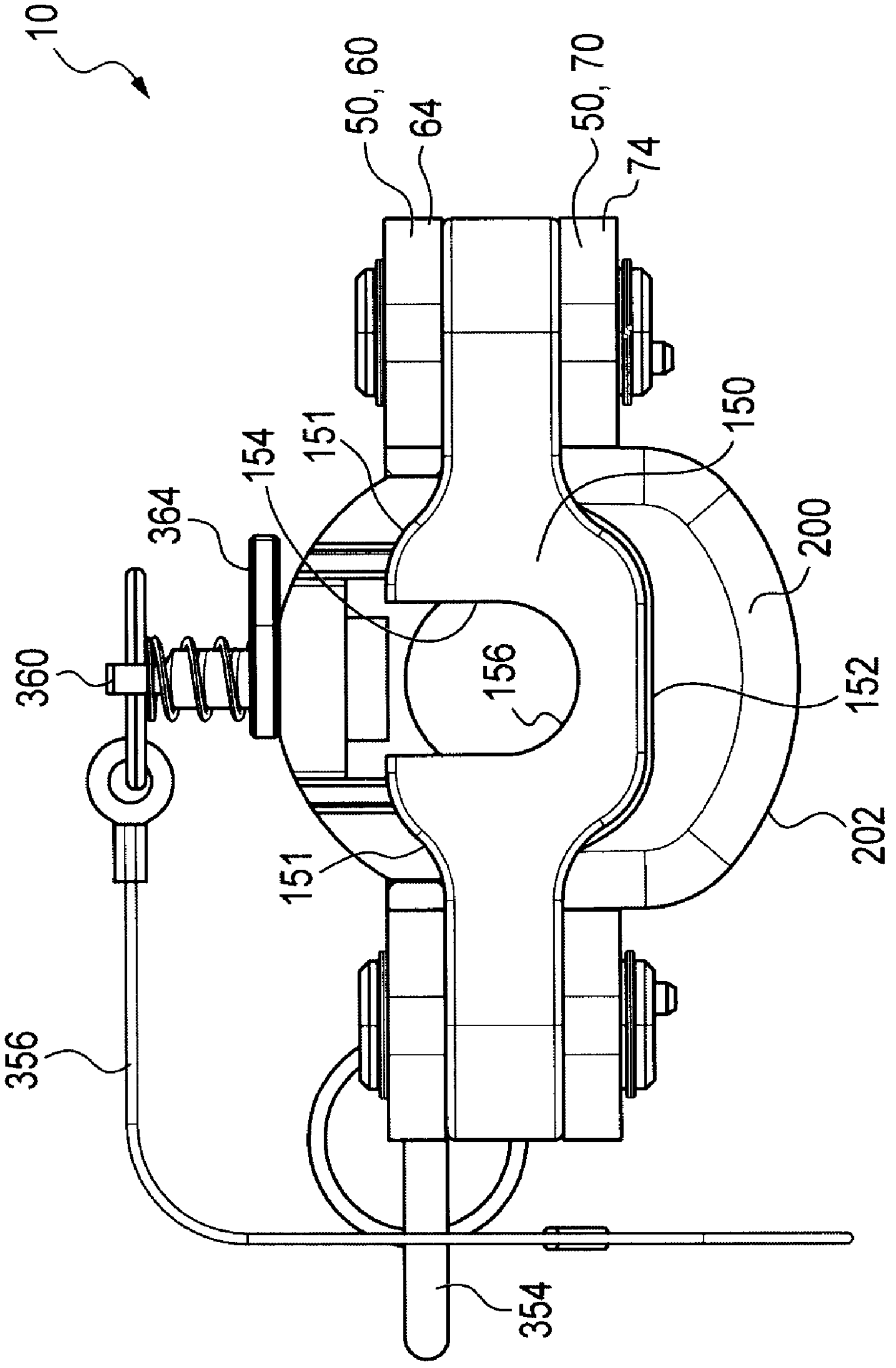
FIG. 10 is an end view of the preferred embodiment press frame depicted in FIG. 1.

FIG. 10 is an end view of the preferred embodiment press frame 10 depicted in FIG. 1. The anvil 150 is shown, and particularly, a preferred configuration for the slotted recess 154 of the anvil is depicted.

Figure 11:
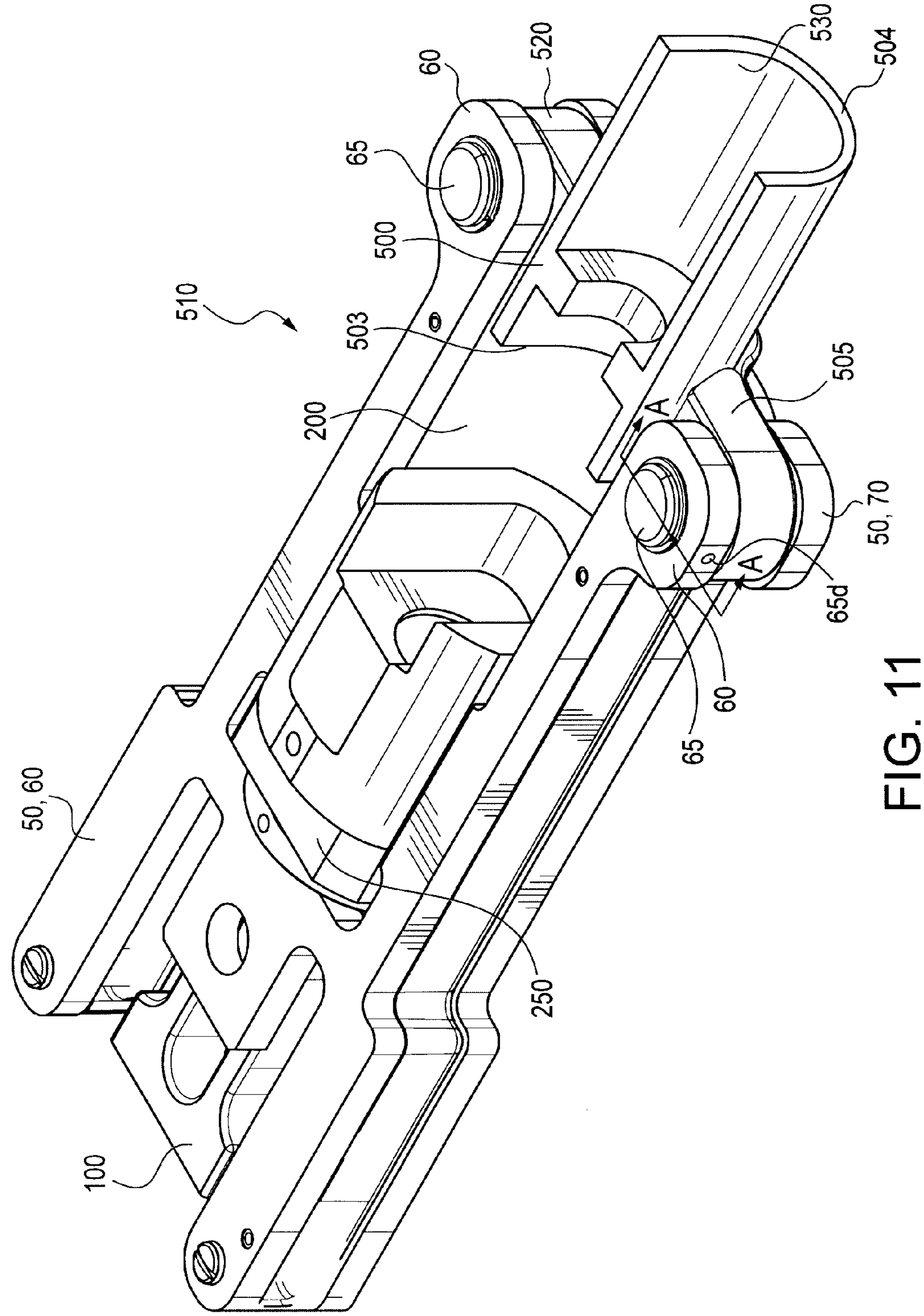
FIG. 11 is a perspective view of another preferred embodiment press frame in accordance with the present invention.

FIG. 11 is a perspective view of another preferred embodiment press frame 510 in accordance with the present invention. In this preferred embodiment 510, many of the same components as used in the preferred embodiment press frame 10 are used, and so those components are identified with the same reference numerals. However, the preferred embodiment press frame 510 comprises a jig shown as 500 in FIG. 11. The jig 500 replaces the previously described anvil used in the press frame 10 and can be secured to the support assembly, such as between the first and second frame members 60 and 70. By use of the jig 500, a single primary shoe 250 can be used as described in greater detail herein. The jig 500 includes a pair of laterally extending mounting arms 505 and 520. The jig 500 defines a first end 503 and a second, oppositely directed end, 504. The jig 500 preferably defines a recess extending generally across the length of the jig 500. A portion of this recess is shown as 530, which is the region defined at the end of the jig 500 proximate to the end 504. The interior configuration of the jig is described in greater detail below. This embodiment 510 of the press frame may be desired since it reduces the overall number of components, thereby increasing manufacturability and likely reducing costs. The jig 500 can be configured such that it can accommodate different size connectors by selecting which end of the jig 500 faces the primary shoe 250. For example, one end of the jig such as the end 503 could be sized and configured to accommodate connectors of a certain length and/or diameter. And, the other end of the jig, i.e. the end 504 could be sized and configured to accommodate connectors having a different length and/or diameter. Depending upon which connector is to be affixed to a cable end, the jig is appropriately positioned such that the end 503 or 504 corresponding to the connector of interest, is positioned so that the selected end faces the primary shoe 250. The jig 500 can be selectively positioned so that in many applications, it is not necessary to use a secondary shoe. Therefore, only the primary shoe 250 is used, which is retained with the press frame 510. Thus, in many applications, the need for auxiliary shoes is eliminated. Therefore, a lanyard assembly may not be necessary.

The jig 500 can be releasable attached or otherwise secured to the frame members 60, 70 by one or more quick release fasteners 65. For example, referring to FIGS. 2 and 11, a first fastener 65 may be disposed within an aperture 68 defined in the frame member 60 and a corresponding aperture 78 defined in the frame member 70. A second fastener 65 may be disposed within corresponding upper and lower apertures 68 and 78 in frame members 60 and 70. The quick release fasteners 65 can utilize nearly any configuration that provides for their quick release upon removal and secure retention upon placement within the frame. For example, the quick release fasteners can employ a configuration and operation similar to quick acting jaw mounting pins typically used on press tools.

Figure 11A:
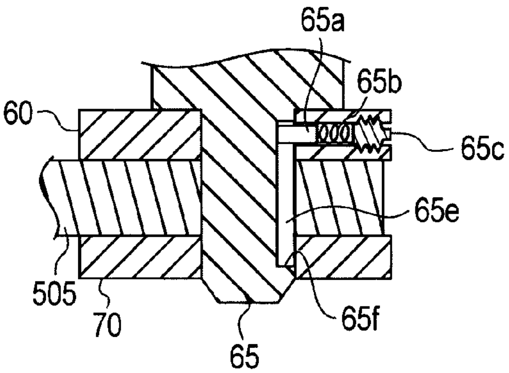
FIG. 11A is a partial cross sectional view taken along line A-A in FIG. 11.

A preferred configuration for a quick release fastener 65 is depicted in FIG. 11A. Referring to that figure, a plunger 65*a*, a spring 65*b*, and a threaded member or set screw 65*c* are disposed in a passage 65*d* (see FIG. 11) defined in a lateral or other exposed region of the frame member 60 or 70. The passage 65*d* preferably defines a threaded region along its interior walls for threaded engagement with the set screw 65*c*. The spring 65*b* is disposed between the plunger 65*a* and the set screw 65*c* and biases the plunger toward the fastener 65. The fastener 65 defines a longitudinally extending slot 65*e* for receiving a distal tip of the plunger 65*a*. The distal tip of the plunger 65*a* is disposed within the slot 65*e* to allow axial movement of the fastener 65. The passage 65*e* extends along a portion of the length of the fastener 65 and terminates at a stop 65*f*. The plunger 65*a* contacts the stop 65*f* which thereby prevents the fastener 65 from being further displaced from the assembly, i.e. the frame members 60, 70. The spring 65*b* urges the plunger 65*a* against the fastener 65 to provide friction to cause fastener 65 to remain in a desired position. The set screw 65*c* can be used to increase or decrease the bias force applied to the plunger 65*a*. Thus, when an operator wishes to remove the jig 500 from the press frame 510, the two fasteners 65 can be partially displaced from their retaining position shown in FIG. 11. Once each fastener 65 is retracted from its engagement with the arms 505 and 520 of the jig 500, the jig 500 can be removed or otherwise repositioned in the frame 510. It will be appreciated that the assembly depicted in FIG. 11A is merely one of numerous assemblies that the press frame may utilize.

Figure 12:
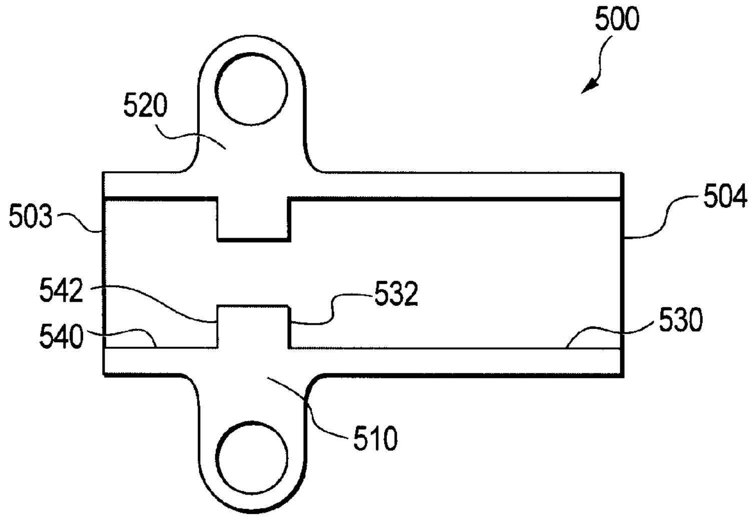
FIG. 12 is a top planar view of a preferred embodiment jig used in the press frame depicted in FIG. 11.

FIG. 12 is a planar top view of the jig 500 depicted in FIG. 11. The jig 500 defines two different interior configurations, such as an opening 530 extending between the end 504 and an interior located annular step 532; and an opening 540 extending between the end 503 and an interior located annular step 542. It will be appreciated that the jig 500 can exhibit a wide array of other combinations of interior configurations such as openings having different lengths, different diameters, different geometries, or different combinations of these aspects.

Figure 13:
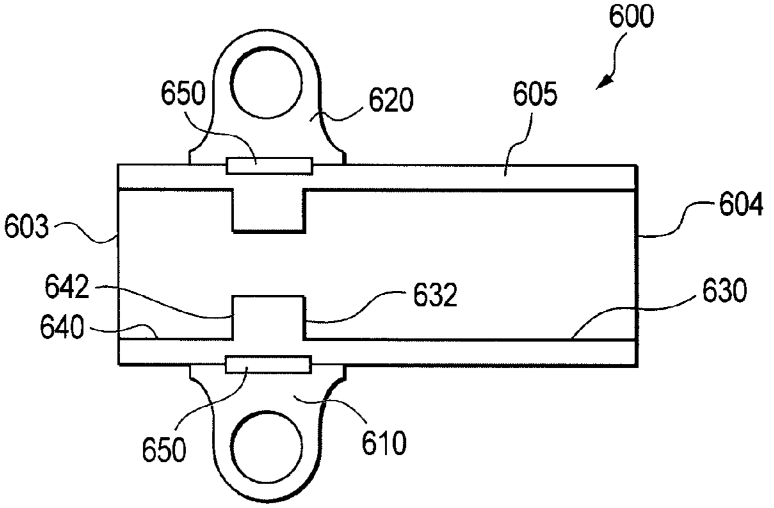
FIG. 13 is a top planar view of another preferred embodiment jig used in the press frame depicted in FIG. 11.

Rather than requiring that the jig 500 be removed from the frame or support assembly of the press frame in order to use its other end, the present invention also includes a jig that comprises a main body that is rotatable about its mounting members. For example, FIG. 13 depicts a jig 600 having a main body 605 that is rotatably attached to two outwardly extending mounting members 610 and 620. The main body 605 is attached to the mounting members 610 and 620 by a pair of bearings 650 or other rotational members. The jig 600 defines two different interior configurations, such as an opening 630 extending between an end 604 and an interior located annular step 632; and an opening 640 extending between an end 603 and an interior located annular step 642. It will be appreciated that the jig 600 can exhibit a wide array of other combinations of interior configurations such as openings having different lengths, different diameters, different geometries, or different combinations of these features. It will be appreciated that the shape of the cover 200 can be suitably configured so as to accommodate the particular design and application. In the event a rotatable jig is used such as jig 600, the cover 200 is preferably formed to accommodate and provide clearance for both ends of the jig.

Figure 14:
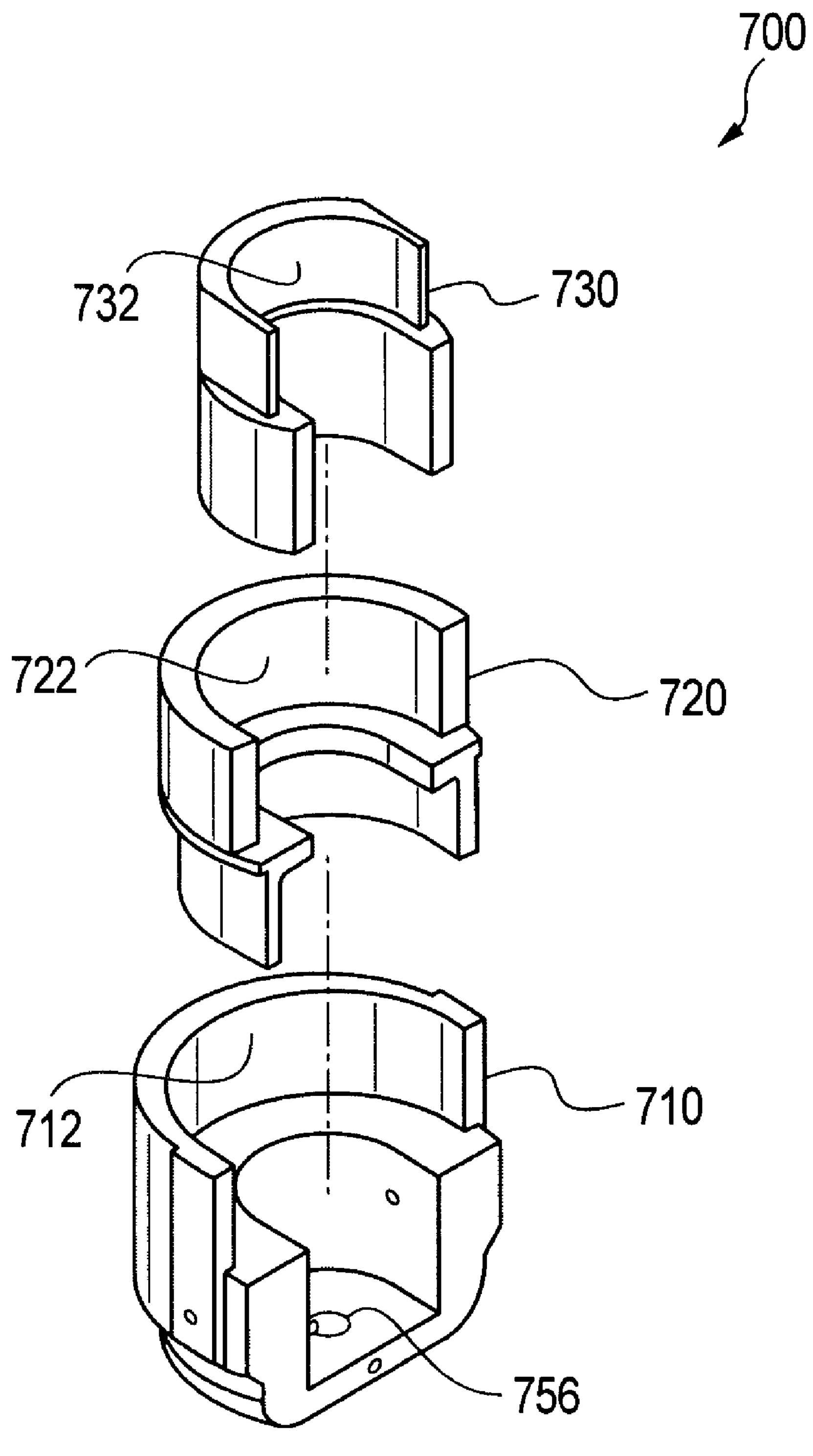
FIG. 14 is a perspective exploded view of a preferred set of nested shoes that may be used in conjunction with the press frames of the present invention.

FIG. 14 is a perspective exploded view of a preferred embodiment set 700 of nested shoes. The set 700 comprises a first shoe 710 having a cradle 712, a second shoe 720 with a cradle 722 sized to fit within the first shoe 710, and a third shoe 730 having a cradle 732. The third shoe 730 is sized to fit within the second shoe 720. The first or largest shoe such as shoe 710 preferably defines an engagement aperture 756 for receipt of a projection from a plunger, as previously described with regard to the preferred press frame 10. As previously explained herein, the term "nest" or "nested" as used herein generally refers to an interface configuration between a plurality of components, e.g. shoes, in which one component fits with or more specifically, fits within, another component. An example of a contemplated nested configuration between shoes is a first shoe having a face that serves as a male portion that fits within a correspondingly sized and shaped female portion defined along a face of a second shoe. It will be appreciated that the present invention includes a wide array of other nested configurations.

The following is an exemplary description of use of a preferred embodiment press frame with a Ridge Tool Compact 100-B Press Tool. The press frame is first inserted into an empty nose or front of the press tool. The jaw mounting pin of the 100-B Press Tool is pulled outward or retracted to enable insertion of the press frame therein. The press frame is then inserted into the press tool. The jaw mounting pin is then inserted to engage the press frame and securely retain the frame with the press tool. The plunger is then preferably positioned towards the end of the press frame nearest the press tool. It is contemplated that for certain embodiments, a detent and retention member may be provided to retain the position of the plunger. In the event that a biasing member is used in association with the plunger, such as to urge the plunger toward the distal end of the press frame, it may be particularly desirable to provide a detent and retention member for the plunger. An outwardly extending member, i.e. the retention member, can be provided on the outer surface of the plunger. A recessed aperture, slot, or other region sized and shaped to receive the retention member can be provided along the interior of the press frame, such as for example, along one or more areas of the frame or support assembly of the press frame. The use of a detent and retention member may be desirable to hold the plunger away from the shoe(s) to facilitate replacement of the shoe(s).

Depending upon the size, style, and configuration of a connector, it may be necessary to replace one or more shoes in a press frame with one or more other shoe(s). In this event, after preferably positioning the plunger away from the shoe (s), the shoe(s) can be removed and then replaced with shoe(s) of desired shape, size, and configuration. One or more pins or other members may be provided on the shoes to assist in alignment of the shoe(s) relative to the press frame. That is, although it is a relatively simple undertaking to properly orient a shoe within the hollow interior of a press frame, it is desirable to also position the shoe at a proper angular orientation within the interior, and when using a housing, within a channel or guideway formed by such housing. After proper placement of the shoe(s) within the press frame, the plunger can be released from its retracted position.

Continuing with the representative description of using a press frame with a Compact 100-B Press Tool, the following is a description of affixing a connector to the end of a cable. The cable type and size generally dictate the type and size of connector to be used, and the application and operator plans typically determine the configuration of connector. For a coaxial cable, a coaxial connector of corresponding size and desired configuration is selected. The cable is appropriately prepared and preferably, the connector is loosely positioned on the end of the cable. For applications involving coaxial cable, generally this involves cutting and removing a portion of the cable jacket from the end of the cable to expose the outer core. This operation is to establish electrical communication with the outer core. Depending upon the type and configuration of the connector, it may also be desirable to remove a portion of the dielectric material surrounding the inner core, from the end of the cable. The selected connector and cable are positioned within the hollow interior of the press frame and the shoe nearest the distal end of the frame and positioned such that the shoe at least partially supports the connector placed therein. Preferably, the connector is positioned within a portion of the shoe such that it is centered in the shoe, and generally centered within the hollow interior of the press frame. The cable extends from the distal end of the connector, preferably through the slotted recessed region of the anvil. In the event a biasing member is used to urge the shoe toward the distal end of the press frame, the shoe or the biasing member is released. Upon appropriate positioning of the shoe, and confirmation by the operator that the cable and connector are in proper position, the press tool is activated to thereby securely attach the connector to the cable. Typically, the press tool and press frame can complete an entire cycle within from about 4 to about 8 seconds. It will be appreciated that the present invention includes faster and slower cycle times.

Figure 15:
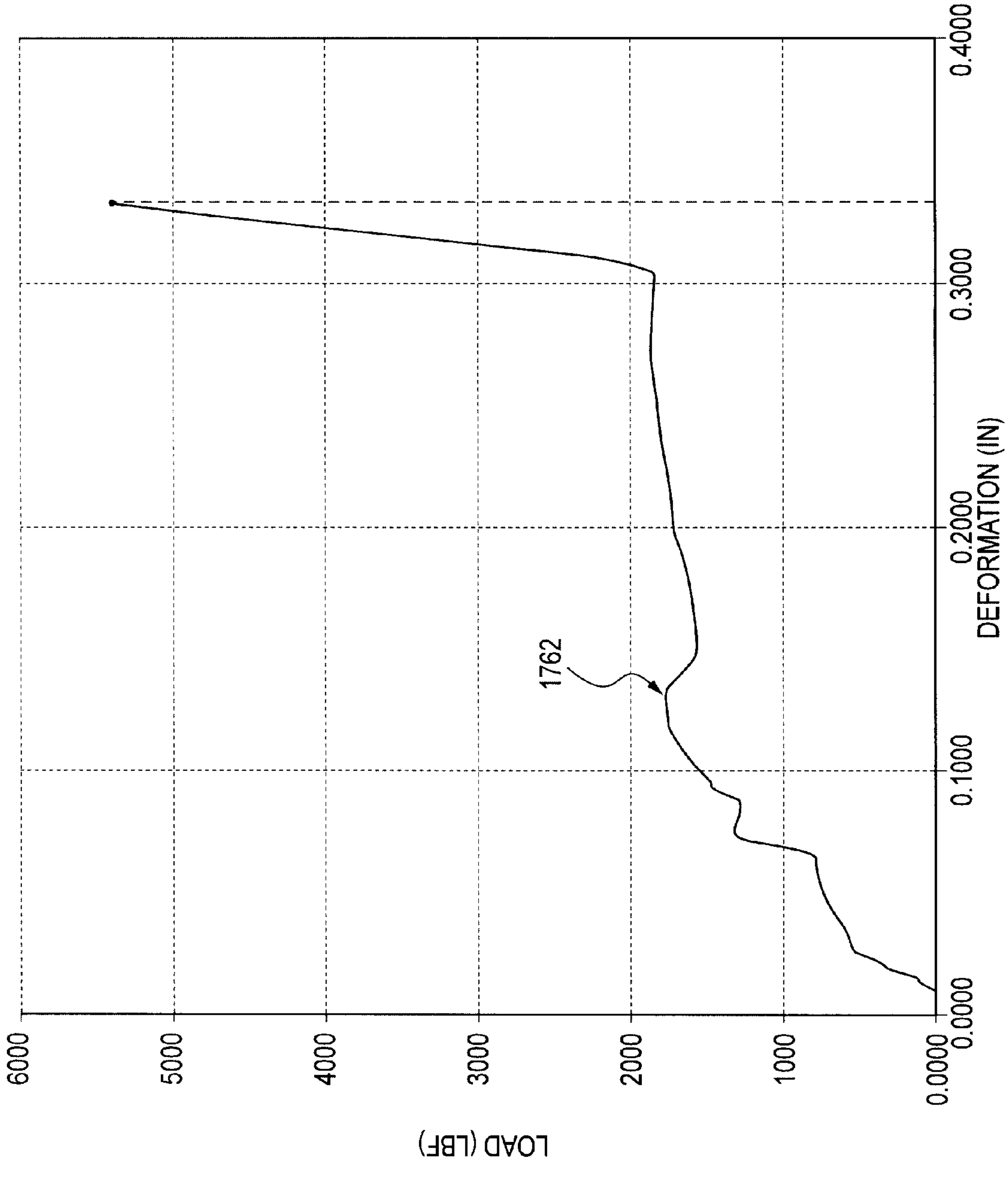
FIG. 15 is a graph of applied force and resulting deformation of an electrical connector being affixed to a cable end by use of a preferred embodiment press frame in accordance with the present invention.

FIG. 15 is a graph illustrating a representative relationship between force and deformation as measured at a connector being affixed to a cable end using a preferred embodiment press frame and a Compact 100-B Press Tool. Upon initiation of connector deformation, it can be seen that the amount of force transmitted to the connector rapidly increases to an initial maximum of about 1762 pounds. Deformation continues until a maximum deformation greater than 0.3 inches is reached. At this point, shown in FIG. 15 as the vertical line to the right of 0.300 on the x-axis, the connector did not readily deform further. Therefore, the applied force then dramatically increased to a preset maximum force of 5,400 pounds (24 KN). The Compact 100-B Press Tool can typically use a preset maximum force of 5,400 pounds (24 KN). This ensures a thorough and secure affixment and seal between the connector and the cable.

The present invention press frame can be used to connect a wide range of connectors to cables. Typically, connectors to be affixed to cable ends have diameters of ¼ inch, 5/16 inch, ⅜ inch, ½ inch, 9/16 inch, ⅝ inch, 11/16 inch, ¾ inch, ⅞ inch, 1¼ inch, and 1⅝ inch. However, it is to be understood that the press frame and its components, and in particular, the shoe(s), can be appropriately sized to accommodate a wide range of different connectors having different sizes, configurations, and geometries. Furthermore, it is envisioned that certain types of plumbing fittings could be axially pressed onto the end of hollow tubular shaped materials with modifications to the interior shapes of anvil and shoe. Representative examples of coaxial connectors that can be affixed to coaxial cables include, but are not limited to UHF connectors, N connectors, BNC connectors, TNC connectors, SMA connectors, 7-16 DIN connectors, F connectors, G connectors, PIII connectors, KS connectors, IEC connectors, and connectors for RG-# or RG-#/U cables. Representative examples of various commercially available connectors that can be used with the present invention press frame include, but are not limited to, those available from Blonder Tongue Laboratories, Inc. of Old Bridge, N.J.; United Electronics Corp. of Weston, Fla.; Keltron Connector Co. of Bohemia, N.Y.; and Tyco Electronics of Berwyn, Pa.

Although it is preferred that the present invention press frame is used by attachment or coupling to a hand-held portable, typically battery powered, press tool; it will be appreciated that the present invention can be used with a wide array of other force-generating devices. Further, it is not necessary that the present invention press frame be used in conjunction with hand-held press tools. Instead, the press frame can be used with non-portable or stationary press tools. And, it will be readily understood that the present invention press frame can be used with a variety of press tools or force-generating assemblies that are not battery powered, but instead, powered from other machine or human powered sources.

The present invention includes press frames with combinations of any of the features described herein.

Many other benefits will no doubt become apparent from future application and development of this technology.

All patents and patent applications referenced herein are incorporated by reference in their entirety.

As described hereinabove, the present invention solves many problems associated with previous type devices. However, it will be appreciated that various changes in the details, materials and arrangements of parts, which have been herein described and illustrated in order to explain the nature of the invention, may be made by those skilled in the art without departing from the principle and scope of the invention, as expressed in the appended claims.

What is claimed is:

1. A press frame adapted for engagement and use with a press tool having a displaceable ram in the tool for applying an axial press force relative to a workpiece or connector positioned in the press frame, the press frame comprising:

a frame defining a first end adapted for engagement with a press tool, a second end opposite from the first end, and a generally hollow interior defined at least partly between the first end and the second end and accessible along an exterior region of the frame;

a movable plunger disposed within the hollow interior defined in the frame and adapted to engage the ram in the press tool and transmit the press force from the press tool;

an anvil disposed proximate the second end of the frame, the anvil defining a slotted recess for receiving at least one of a workpiece and a connector to be joined thereto;

at least one shoe movably disposed within the hollow interior defined by the frame, the at least one shoe defining a proximal face directed toward the first end of the frame and a distal face directed toward the second end of the frame, the at least one shoe defining a cradle along the distal face for receiving and supporting a connector; and a biasing element for urging the at least one shoe toward the second end of the frame.

2. The press frame of claim 1 wherein the biasing element includes a post secured to the at least one shoe and a spring extending between the post and the frame.

3. The press frame of claim 2 wherein the biasing element further includes an alignment member.

4. The press frame of claim 1 wherein the at least one shoe comprises a primary shoe and a secondary shoe, the primary shoe disposed between the first end of the frame and the secondary shoe, and the secondary shoe disposed between the primary shoe and the anvil.

5. The press frame of claim 4 wherein the primary shoe defines a proximal face directed toward the first end of the frame, and an oppositely directed distal face directed toward the second end of the frame, the primary shoe also defining a recessed receiving region along the distal face, the secondary shoe defines a proximal face directed toward the first end of the frame, and an oppositely directed distal face directed toward the second end of the frame, the secondary shoe including a projecting engagement region extending from the proximal face of the secondary shoe, wherein the projecting engagement region of the secondary shoe is adapted to contact the recessed receiving region of the primary shoe.

6. The press frame of claim 1 further comprising:

a housing affixed to the frame and generally enclosing an underside of the frame.

7. The press frame of claim 1 further comprising:

a lanyard assembly releasably attaching the at least one shoe to the frame.

8. The press frame of claim 7 wherein the lanyard assembly includes:

a post secured to the at least one shoe;

a releasable clasp secured to the frame; and a cable extending between the post and the clasp.

9. The press frame of claim 1 wherein the anvil comprises at least one rotational member by which the anvil is releasably secured to the frame, the at least one rotational member enabling the anvil to be rotated about the rotational member while the anvil is secured to the frame.

10. The press frame of claim 1 wherein the plunger defines a longitudinal opening for receiving an engagement member of the press tool when the press frame is engaged thereto.

* * * * *